United States Patent
Li et al.

(10) Patent No.: US 11,770,026 B2
(45) Date of Patent: *Sep. 26, 2023

(54) LOW GAIN WIRELESS POWER TRANSFER SYSTEM AND METHOD

(71) Applicant: NuVolta Technologies (Hefei) Co., Ltd., Hefei (CN)

(72) Inventors: Zhengyu Li, Shanghai (CN); Kaiyong Cui, Shanghai (CN); Zeng Li, Shanghai (CN); Zhijun Luo, Shanghai (CN); Min Yang, Shanghai (CN)

(73) Assignee: NuVolta Technologies (Hefei) Co., Ltd., Hefei (CN)

(*) Notice: Subject to any disclaimer, the term of this patent is extended or adjusted under 35 U.S.C. 154(b) by 32 days.

This patent is subject to a terminal disclaimer.

(21) Appl. No.: 17/409,335

(22) Filed: Aug. 23, 2021

(65) Prior Publication Data

US 2022/0302759 A1    Sep. 22, 2022

Related U.S. Application Data

(63) Continuation of application No. 17/237,542, filed on Apr. 22, 2021.

(30) Foreign Application Priority Data

Mar. 17, 2021    (CN) .......................... 202110289122.7

(51) Int. Cl.
*H02J 50/12*    (2016.01)
*H02J 50/40*    (2016.01)

(52) U.S. Cl.
CPC .............. *H02J 50/12* (2016.02); *H02J 50/40* (2016.02)

(58) Field of Classification Search
CPC ............ H02J 50/12; H02J 50/40; Y02B 70/10
See application file for complete search history.

(56) References Cited

U.S. PATENT DOCUMENTS

| | | | | |
|---|---|---|---|---|
| 2009/0067207 | A1* | 3/2009 | Nishino | B60L 5/005 363/126 |
| 2016/0141881 | A1* | 5/2016 | Hassan-Ali | H02J 50/10 307/104 |
| 2017/0012452 | A1* | 1/2017 | Kang | H02J 7/02 |
| 2017/0104368 | A1* | 4/2017 | Radke | H02H 1/0061 |

(Continued)

FOREIGN PATENT DOCUMENTS

CN    109327060 A    2/2019

*Primary Examiner* — Daniel Kessie
*Assistant Examiner* — Brian K Baxter
(74) *Attorney, Agent, or Firm* — AP3 Law Firm PLLC

(57) ABSTRACT

An apparatus includes a controller configured to control switches of a receiver, the receiver comprising a first receiver coil configured to be magnetically coupled to a transmitter coil of a wireless power transfer system, a rectifier circuit coupled to two terminals of the first receiver coil, a second receiver coil and a first auxiliary switch, wherein the second receiver coil is connected in series with the first auxiliary switch, and the second receiver coil is configured to be magnetically coupled to the transmitter coil, and wherein in response to a low power mode of the apparatus, the controller is configured to turn on the first auxiliary switch such that the first receiver coil and the second receiver coil are connected in series to boost a gain of the wireless power transfer system.

19 Claims, 18 Drawing Sheets

(56) References Cited

U.S. PATENT DOCUMENTS

| | | | |
|---|---|---|---|
| 2019/0173388 A1* | 6/2019 | Suryanarayana | H02M 7/48 |
| 2019/0229615 A1* | 7/2019 | Sanders | H02M 3/156 |
| 2021/0044151 A1* | 2/2021 | Nakao | H02J 50/80 |
| 2021/0075261 A1* | 3/2021 | Chen | H02J 7/0047 |
| 2021/0075270 A1* | 3/2021 | Choi | H02J 50/402 |
| 2021/0085987 A1* | 3/2021 | Fried | A61N 1/37223 |
| 2021/0091600 A1* | 3/2021 | Chen | H02J 50/12 |

\* cited by examiner

LOW GAIN WIRELESS POWER TRANSFER SYSTEM AND METHOD

PRIORITY CLAIM

This application is a continuation of U.S. patent application Ser. No. 17/237,542, filed on Apr. 22, 2021, which claims priority to Chinese Patent Application No. 202110289122.7, filed on Mar. 17, 2021, each is hereby incorporated by reference in its entirety.

TECHNICAL FIELD

The present invention relates to a low gain receiver, and, in particular embodiments, to a low gain receiver in a wireless power transfer system.

BACKGROUND

As technologies further advance, wireless power transfer has emerged as an efficient and convenient mechanism for powering or charging battery based mobile devices such as mobile phones, tablet PCs, digital cameras, MP3 players and/or the like. A wireless power transfer system typically comprises a primary side transmitter and a secondary side receiver. The primary side transmitter is magnetically coupled to the secondary side receiver through a magnetic coupling. The magnetic coupling may be implemented as a loosely coupled transformer having a primary side coil formed in the primary side transmitter and a secondary side coil formed in the secondary side receiver.

The primary side transmitter may comprise a power conversion unit such as a primary side of a power converter. The power conversion unit is coupled to a power source and is capable of converting electrical power to wireless power signals. The secondary side receiver is able to receive the wireless power signals through the loosely coupled transformer and convert the received wireless power signals to electrical power suitable for a load.

As power consumption has become more important, there may be a need for high power density and high efficiency wireless power transfer systems. In a high power wireless transfer system, a larger current output leads to a temperature rise in the receiver coil of the wireless power transfer system. Such a temperature rise causes poor system efficiency. In order to overcome this drawback, a low inductance receiver coil may be employed to reduce the temperature rise in the receiver coil. However, the receiver having a low inductance receiver coil may be used in a variety of applications such as a low power application (e.g., the power of the wireless power transfer system is less than 10 W). In the low power application, the receiver having a low inductance receiver coil is not compatible with a low power transmitter (e.g., a transmitter having a low input voltage). It would be desirable to have a high performance receiver exhibiting good behaviors. For example, a high efficiency receiver is compatible with a variety of operating conditions.

SUMMARY

These and other problems are generally solved or circumvented, and technical advantages are generally achieved, by preferred embodiments of the present disclosure which provide a high efficiency receiver compatible with a variety of operating conditions.

In accordance with an embodiment, an apparatus comprises a controller configured to control switches of a receiver, the receiver comprising a first receiver coil configured to be magnetically coupled to a transmitter coil of a wireless power transfer system, a rectifier circuit coupled to two terminals of the first receiver coil, a second receiver coil and a first auxiliary switch, wherein the second receiver coil is connected in series with the first auxiliary switch, and the second receiver coil is configured to be magnetically coupled to the transmitter coil, and wherein in response to a low power mode of the apparatus, the controller is configured to turn on the first auxiliary switch such that the first receiver coil and the second receiver coil are connected in series to boost a gain of the wireless power transfer system.

In accordance with another embodiment, a method comprises determining, by a controller, an operating mode of a wireless power transfer system comprising a transmitter coil, a plurality of receiver coils, a rectifier circuit coupled to the plurality of receiver coils and an auxiliary switch connected in series with one receiver coil of the plurality of receiver coils, in response to a low power mode of the wireless power transfer system, turning on the auxiliary switch through a signal generated by the controller, wherein as a result of turning on the auxiliary switch, at least two receiver coils of the plurality of receiver coils are connected in series to boost a gain of the wireless power transfer system, and in response to a high power mode of the wireless power transfer system, turning off the auxiliary switch through the signal generated by the controller, wherein as a result of turning off the auxiliary switch, a gain of the wireless power transfer system is reduced.

In accordance with yet another embodiment, a controller comprises a circuit configured to control an auxiliary switch and switches of a rectifier circuit, wherein the rectifier circuit is coupled to a first receiver coil configured to be magnetically coupled to a transmitter coil of a wireless power transfer system, and the auxiliary switch and a second receiver coil are connected in series, wherein in response to a low power mode of the wireless power transfer system, the controller is configured to turn on the auxiliary switch such that the first receiver coil and the second receiver coil are connected in series to boost a gain of the wireless power transfer system.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a low gain receiver compatible with different operating conditions. The invention may also be applied, however, to a variety of power conversion devices of a wireless power transfer system. Hereinafter, various embodiments will be explained in detail with reference to the accompanying drawings.

Figure 1:
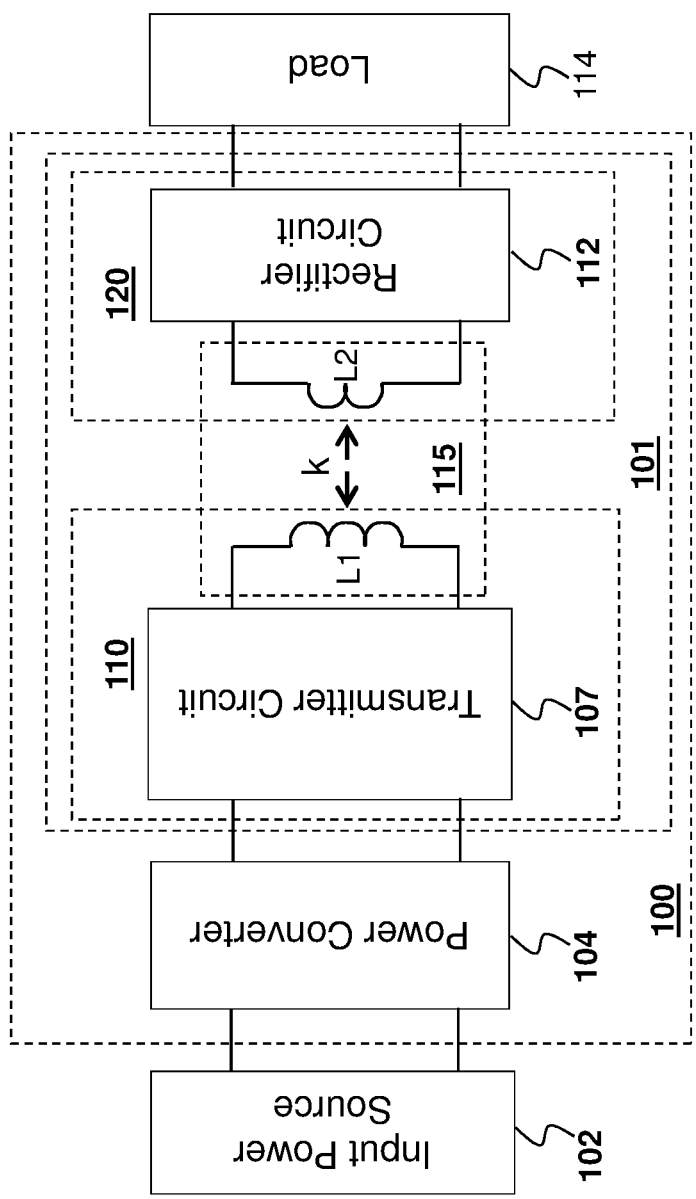
FIG. 1 illustrates a block diagram of a wireless power transfer system in accordance with various embodiments of the present disclosure.

FIG. 1 illustrates a block diagram of a wireless power transfer system in accordance with various embodiments of the present disclosure. The wireless power transfer system 100 comprises a power converter 104 and a wireless power transfer device 101 connected in cascade between an input power source 102 and a load 114. The wireless power transfer device 101 includes a transmitter 110 and a receiver 120. As shown in FIG. 1, the transmitter 110 comprises a transmitter circuit 107 and a transmitter coil L1 connected in cascade. The input of the transmitter circuit 107 is coupled to an output of the power converter 104. The receiver 120 comprises a receiver coil L2 and a rectifier circuit 112 connected in cascade. The output of the rectifier circuit 112 is coupled to the load 114.

The transmitter 110 is magnetically coupled to the receiver 120 through a magnetic field when the receiver 120 is placed near the transmitter 110. A loosely coupled transformer 115 is formed by the transmitter coil L1, which is part of the transmitter 110, and the receiver coil L2, which is part of the receiver 120. As a result, power may be transferred from the transmitter 110 to the receiver 120.

In some embodiments, the transmitter 110 may be inside a charging pad. The transmitter coil is placed underneath the top surface of the charging pad. The receiver 120 may be embedded in a mobile phone. When the mobile phone is place near the charging pad, a magnetic coupling may be established between the transmitter coil and the receiver coil. In other words, the transmitter coil and the receiver coil may form a loosely coupled transformer through which a power transfer occurs between the transmitter 110 and the receiver 120. The strength of coupling between the transmitter coil L1 and the receiver coil L2 is quantified by the coupling coefficient k. In some embodiments, k is in a range from about 0.05 to about 0.9.

In some embodiments, after the magnetic coupling has been established between the transmitter coil L1 and the receiver coil L2, the transmitter 110 and the receiver 120 may form a power system through which power is wirelessly transferred from the input power source 102 to the load 114.

The input power source 102 may be a power adapter converting a utility line voltage to a direct-current (dc) voltage. Alternatively, the input power source 102 may be a renewable power source such as a solar panel array. Furthermore, the input power source 102 may be an energy storage device such as rechargeable batteries, fuel cells and/or the like.

The load 114 represents the power consumed by the mobile device (e.g., a mobile phone) coupled to the receiver 120. Alternatively, the load 114 may refer to a rechargeable battery and/or batteries connected in series/parallel, and coupled to the output of the receiver 120.

The transmitter circuit 107 may comprise primary side switches of a full-bridge converter according to some embodiments. Alternatively, the transmitter circuit 107 may comprise the primary side switches of other converters such as a half-bridge converter, a push-pull converter and the like.

It should be noted that the converters described above are merely examples. One having ordinary skill in the art will recognize other suitable power converters such as class E topology based power converters (e.g., a class E amplifier), may alternatively be used.

The transmitter circuit 107 may further comprise a resonant capacitor. The resonant capacitor and the magnetic inductance of the transmitter coil may form a resonant tank. Depending on design needs and different applications, the resonant tank may further include a resonant inductor. In some embodiments, the resonant inductor may be implemented as an external inductor. In alternative embodiments, the resonant inductor may be implemented as a connection wire.

The receiver 120 comprises the receiver coil L2 magnetically coupled to the transmitter coil L1 after the receiver 120 is placed near the transmitter 110. As a result, power may be transferred to the receiver coil and further delivered to the load 114 through the rectifier circuit 112. The receiver 120 may comprise a secondary resonant capacitor.

The rectifier circuit 112 converts an alternating polarity waveform received from the output of the receiver coil L2 to a single polarity waveform. In some embodiments, the rectifier circuit 112 is a full-wave bridge formed by switching elements such as n-type metal oxide semiconductor (NMOS) transistors.

Furthermore, the rectifier circuit 112 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like.

The power converter 104 is coupled between the input power source 102 and the input of the wireless power transfer device 101. Depending design needs and different applications, the power converter 104 may comprise many different configurations. In some embodiments, the power converter 104 may be a non-isolated power converter such as a buck converter. In some embodiments, the power converter 104 may be implemented as a linear regulator. In some embodiments, the power converter 104 may be an isolated power converter such as a forward converter.

The implementation of the power converter 104 described above is merely an example, which should not unduly limit the scope of the claims. One of ordinary skill in the art would recognize many variations, alternatives, and modifications.

In operation, the wireless power transfer system 100 may be configured to operate in a high power mode. In the high power mode, the transmitter is a high power transmitter configured to receive a high input voltage (e.g., 20V). The wireless power transfer system 100 is configured to transfer a large amount of power. In some embodiments, the maximum power transferred between the transmitter and the receiver is in a range from about 40 W to about 80 W. On the other hand, the wireless power transfer system 100 may be configured to operate in a low power mode. In the low power mode, the transmitter is a low power transmitter configured to receive a low input voltage (e.g., 10V). The wireless power transfer system 100 is configured to transfer a small amount of power, or the input voltage of the wireless power transfer system is low. In some embodiments, the maximum power transferred between the transmitter and the receiver is in a range from about 5 W to about 10 W. It should be noted that the power levels of the high power mode and the low power mode described above are merely examples, which should not unduly limit the scope of the claims. One of ordinary skill in the art would recognize many variations, alternatives, and modifications. For example, depending on different applications and design needs, the power transferred between the transmitter and the receiver in the high power mode may be greater than 120 W. Furthermore, the power transferred between the transmitter and the receiver in the low power mode may be in a range from about 30 W to about 40 W.

In some embodiments, the receiver 120 comprises multiple receiver coils. In particular, the receiver 120 comprises at least two receiver coils. A first receiver coil is the receiver coil L2 shown in FIG. 1. A second receiver coil is connected in series with an auxiliary switch. The second receiver coil and the auxiliary switch are configured such that the receiver 120 is compatible with different applications. More particularly, when the wireless power transfer system 100 is configured to operate in the high power mode, the receiver 120 and the transmitter 110 form a low gain wireless power transfer system. In some embodiments, the gain between the receiver and the transmitter is about 0.5. For example, when the input voltage of the transmitter is about 20 V, the output voltage of the receiver is about 10 V.

In the high power mode, the second receiver coil is disconnected from the first receiver coil by turning off the auxiliary switch. The power is transferred between the transmitter coil L1 and the first receiver coil L2. The first receiver coil L2 is smaller than the transmitter coil L1. Such a small inductance coil helps to reduce the resistance of the receiver coil, thereby reducing the thermal stress on the receiver 120.

On the other hand, when the wireless power transfer system 100 is configured to operate in the low power mode, the first receiver coil and the second receiver coil are connected in series through turning on the auxiliary switch. The first receiver coil and the second receiver coil form an equivalent coil having a normal inductance. In other words, the receiver 120 and the transmitter 110 form a wireless power transfer system having a normal gain. In some embodiments, the normal gain between the receiver and the transmitter is about 0.9. For example, when the input voltage of the transmitter is about 20 V, the output voltage of the receiver is about 18 V.

Figure 2:
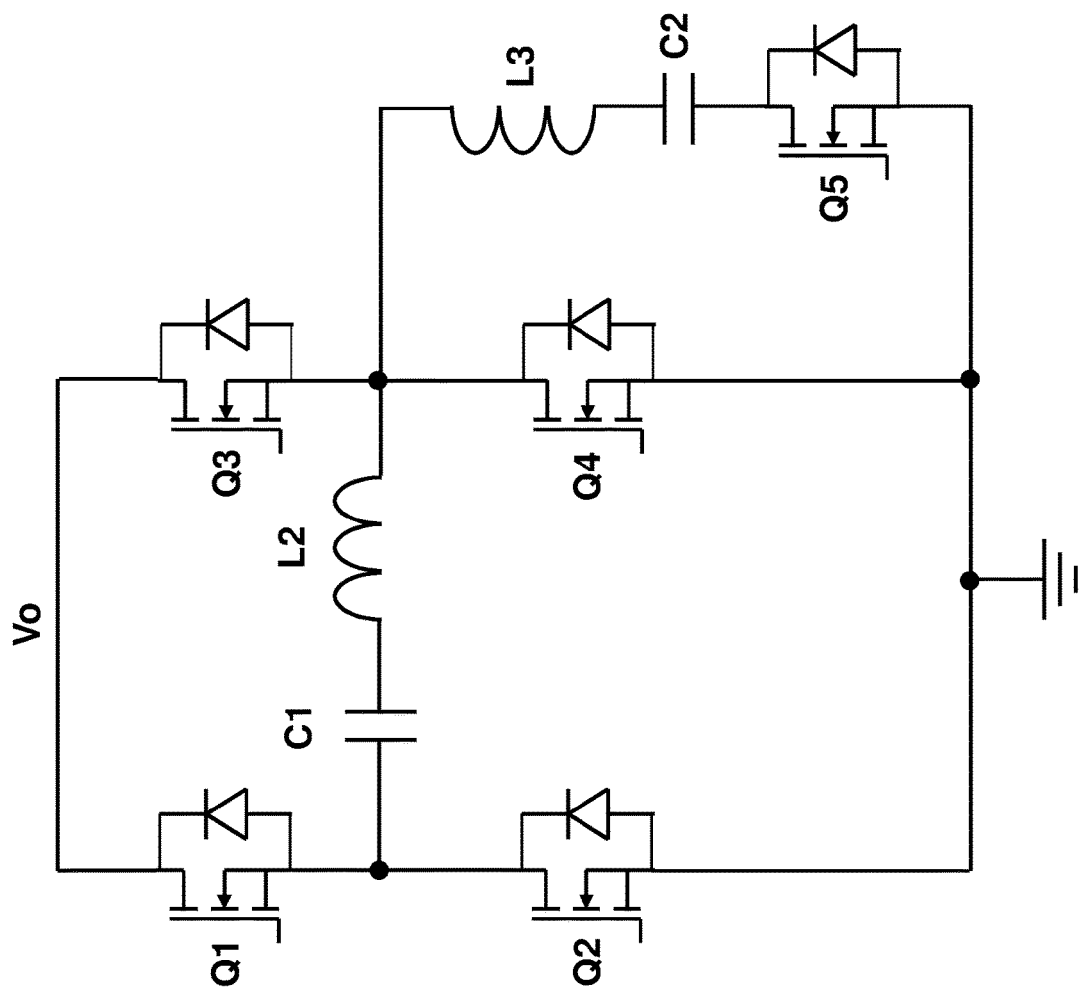
FIG. 2 illustrates a schematic diagram of a first implementation of the receiver of the wireless power transfer system shown in FIG. 1 in accordance with various embodiments of the present disclosure.

FIG. 2 illustrates a schematic diagram of a first implementation of the receiver of the wireless power transfer system shown in FIG. 1 in accordance with various embodiments of the present disclosure. Referring back to FIG. 1, the receiver 120 of the wireless power transfer system 100 comprises a rectifier circuit 112 connected between the receiver coil L2 and the load 114. In some embodiments, the rectifier circuit 112 is implemented as a full-bridge rectifier as shown in FIG. 2. The rectifier circuit 112 is coupled to the output (Vo) of the wireless power transfer system. The rectifier circuit 112 is configured to convert an alternating polarity waveform received into a single polarity waveform. The single polarity waveform is fed into a load such as a battery.

In order to improve the gain of the wireless power transfer system so that the receiver 120 is able to operate in a variety of operating conditions, one additional receiver coil L3 is coupled to the full-bridge rectifier through an auxiliary switch Q5 as shown in FIG. 2. The two receiver coils L2 and L3 are magnetically coupled to the transmitter coil for transferring energy in the wireless power transfer system. Throughout the description, the receiver coil L2 may be alternatively referred to as a first receiver coil. The receiver coil L3 may be alternatively referred to as a second receiver coil.

The inductance of the second receiver coil L3 is greater than the inductance of the first receiver coil L2. In some embodiments, the inductance of the second receiver coil L3 is greater than 6 uH. The inductance of the first receiver coil L2 is less than 3 uH.

In order to improve the efficiency of the wireless power transfer system, a first capacitor C1 is connected in series with the first receiver coil L2. A second capacitor C2 is connected in series with the second receiver coil L3. Both the first capacitor C1 and the second capacitor C2 are resonant capacitors.

The full-bridge rectifier includes four switches Q1, Q2, Q3 and Q4. As shown in FIG. 2, the first switch Q1 and the second switch Q2 are connected in series between the output terminal Vo of the wireless power transfer system 100 and ground. Likewise, the third switch Q3 and the fourth switch Q4 are connected in series between the output terminal Vo of the wireless power transfer system 100 and ground. The common node of the switches Q1 and Q2 is coupled to a first input terminal of the first receiver coil L2 through the first capacitor C1. The common node of the switches Q3 and Q4 is coupled to a second input terminal of the first receiver coil L2.

The second receiver coil L3, the second capacitor C2 and the auxiliary switch Q5 are connected in series between the common node of the switches Q3 and Q4, and ground. In operation, in response to a low power mode of the wireless power transfer system, the auxiliary switch Q5 is turned on. As a result of turning on Q5, the first receiver coil L2 and the second receiver coil L3 are connected in series to boost a gain of the wireless power transfer system. In response to a high power mode of the wireless power transfer system, the auxiliary switch Q5 is turned off. As a result of turning off Q5, the second receiver coil L3 is disconnected from the first receiver coil L2. As a result of disconnecting the second receiver coil L3 from the first receiver coil L2, the gain of the wireless power transfer system is reduced accordingly.

According to some embodiments, the switches Q1, Q2, Q3, Q4 and Q5 are implemented as MOSFET or MOSFETs connected in parallel, any combinations thereof and/or the like. According to alternative embodiments, the switching elements (e.g., switch Si) may be an IGBT device. Alternatively, the primary switches can be any controllable switches such as IGCT devices, GTO devices, SCR devices, JFET devices, MCT devices, GaN based power devices and/or the like.

It should be noted that while FIG. 2 illustrates four switches Q1-Q4, various embodiments of the present disclosure may include other variations, modifications and alternatives. For example, a separate capacitor may be connected in parallel with each switch of the rectifier circuit. Such a separate capacitor helps to better control the timing of the resonant process of the rectifier circuit.

In operation, the receiver is configured to operate in two different phases in response to a low power mode of the wireless power transfer system. In the two different phases, the first receiver coil L2 and the second receiver coil L3 are connected in series. The series-connected receiver coils and switches Q1-Q4 form a half-bridge rectifier. The detailed operating principle of these two phases will be discussed below with respect to FIGS. 3-4.

Figure 3:
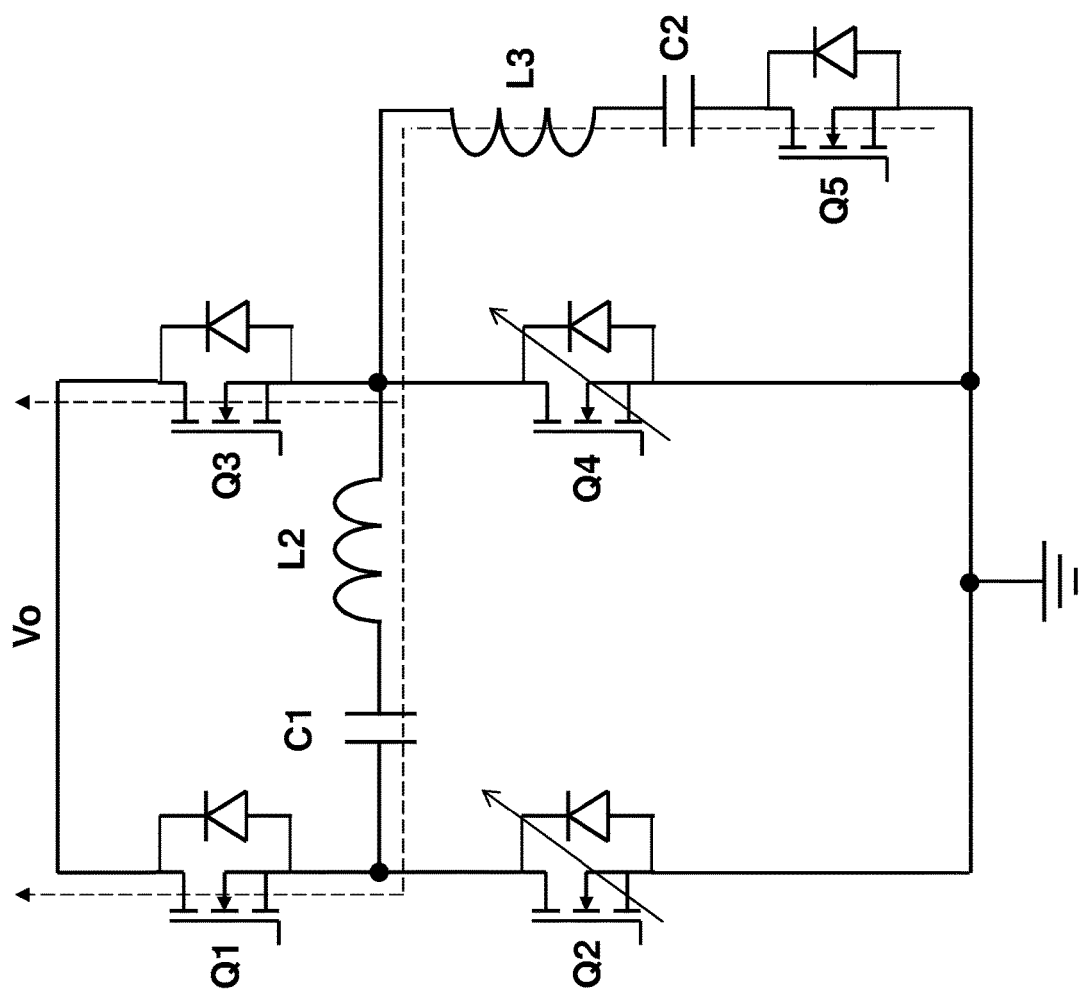
FIG. 3 illustrates a schematic diagram of the receiver configured to operate in a first phase of a low power mode in accordance with various embodiments of the present disclosure.

FIG. 3 illustrates a schematic diagram of the receiver configured to operate in a first phase of a low power mode in accordance with various embodiments of the present disclosure. In some embodiments, the receiver shown in FIG. 2 is configured to operate in the low power mode. In the low power mode, the transmitter is a low power transmitter. For example, the power transferred between the transmitter and the receiver is in a range from about 5 W to about 10 W. The input voltage of the transmitter is about 10 V. In order to be compatible with the low power mode, the gain of the receiver has to be increased accordingly. As shown in FIG. 3, the auxiliary switch Q5 is turned on. As a result of turning on the auxiliary switch Q5, the second receiver coil L3 and the first receiver coil L2 are connected in series. Such a series connection of receiver coils L2 and L3 helps to increase the gain of the receiver.

In the first phase of the low power mode, the switches Q2 and Q4 are turned off as indicated by the arrows on the respective symbols. The switches Q1 and Q3 are turned on. The current flows through the auxiliary switch Q5, the second capacitor C2, the second receiver coil L3, and splits into a first conducive path and a second conductive path, respectively. The first conductive path comprises the first switch Q1, the first capacitor C1 and the first receiver coil L2. The second conductive path comprises the third switch Q3.

Figure 4:
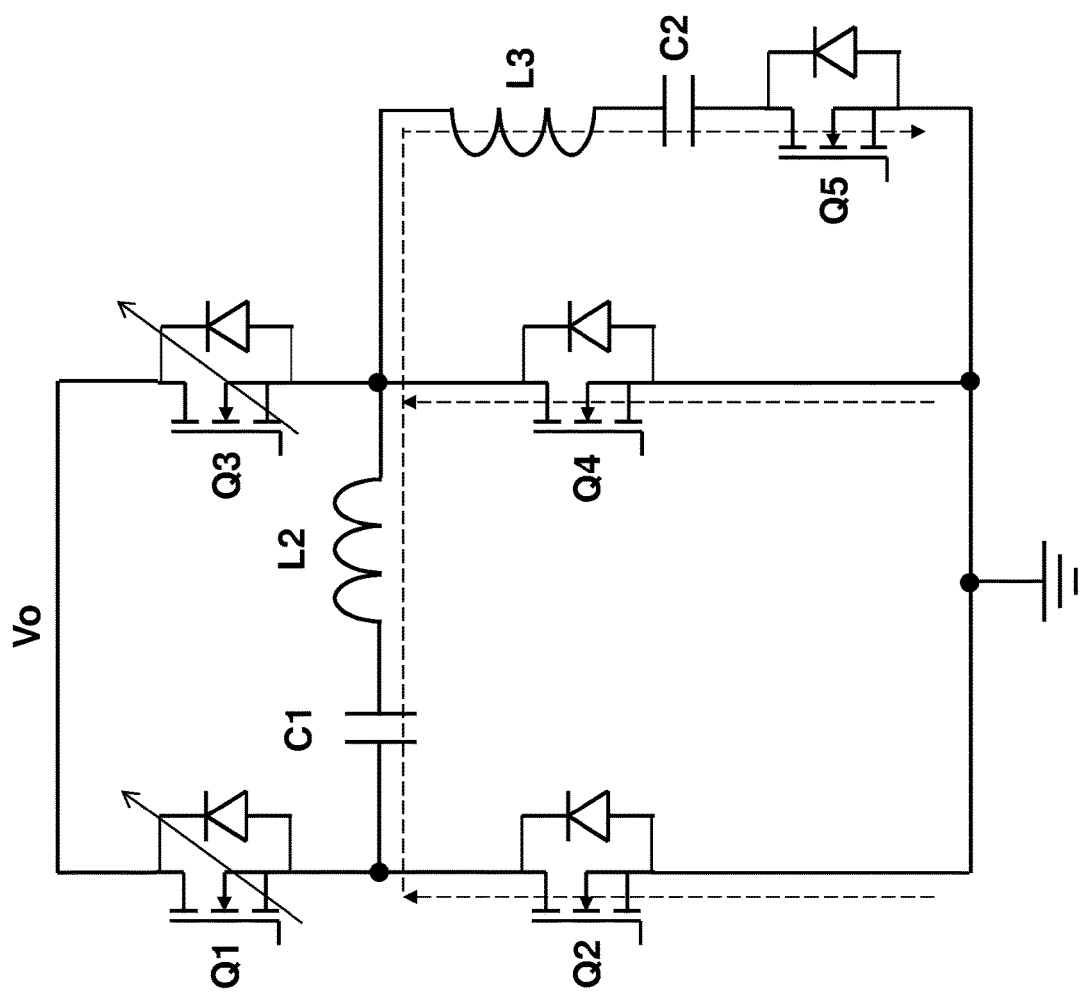
FIG. 4 illustrates a schematic diagram of the receiver configured to operate in a second phase of the low power mode in accordance with various embodiments of the present disclosure.

FIG. 4 illustrates a schematic diagram of the receiver configured to operate in a second phase of the low power mode in accordance with various embodiments of the present disclosure. In the second phase of the low power mode, the switches Q1 and Q3 are turned off as indicated by the arrows on the respective symbols. The switches Q2 and Q4 are turned on. The current flows through the auxiliary switch Q5, the second capacitor C2, the second receiver coil L3, and splits into a third conducive path and a fourth conductive path, respectively. The third conductive path comprises the second switch Q2, the first capacitor c1 and the first receiver coil L2. The fourth conductive path comprises the fourth switch Q4.

One advantageous feature of having the low power mode described above with respect to FIGS. 3-4 is the current splits into two different paths. As a result of having these two different current paths, the thermal stress of the receiver is reduced in comparison with the conventional half-bridge rectifier.

Another advantageous feature of having the low power mode described above with respect to FIGS. 3-4 is the gain of the wireless power transfer system may be adjustable by connecting the second receiver coil L3 in series with the first receiver coil L2. For example, the gain of the wireless power transfer system may be adjusted by selecting the size of the second receiver coil L3. In some embodiments, the size of the second receiver coil L3 may be selected such that the gain of the wireless power transfer system is greater than 1.

Referring back to FIG. 2, the receiver may be configured to operate in two different phases in response to a high power mode. In the two different phases, the second receiver coil L3 is disconnected from the first receiver coil L2. The first receiver coil L2 and switches Q1-Q4 form a full-bridge rectifier. The detailed operating principle of these two phases will be discussed below with respect to FIGS. 5-6.

Figure 5:
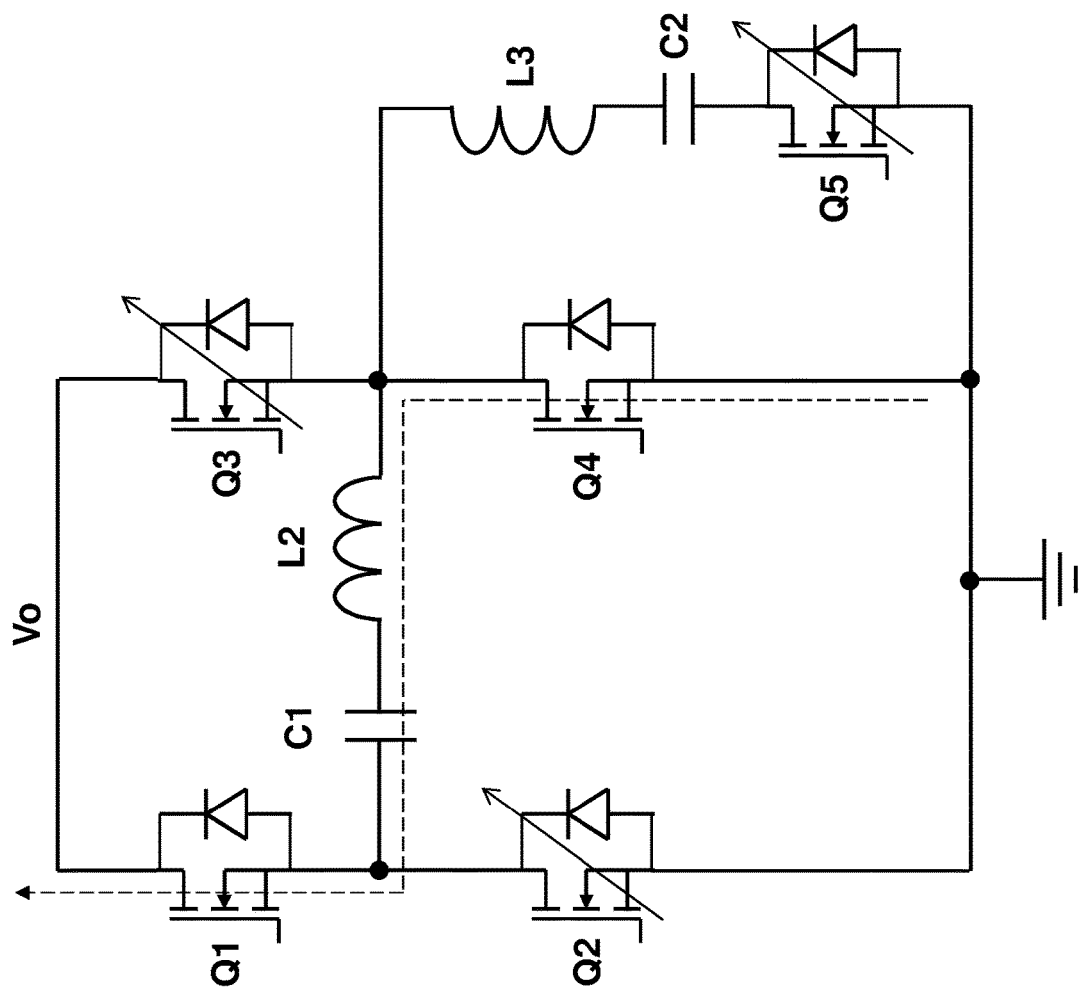
FIG. 5 illustrates a schematic diagram of the receiver configured to operate in a first phase of a high power mode in accordance with various embodiments of the present disclosure.

FIG. 5 illustrates a schematic diagram of the receiver configured to operate in a first phase of a high power mode in accordance with various embodiments of the present disclosure. In some embodiments, the receiver shown in FIG. 2 is configured to operate in the high power mode. In the high power mode, the transmitter is a high power transmitter. For example, the power transferred between the transmitter and the receiver is in a range from about 40 W to about 80 W. The input voltage of the transmitter is about 20 V. In order to be compatible with the high power transmitter, the gain of the receiver has to be reduced accordingly. As shown in FIG. 5, the auxiliary switch Q5 is turned off. As a result of turning off the switch Q5, the second receiver coil L3 is disconnected from the first receiver coil L2. In other words, the current cannot flow through the second receiver coil L3. The first receiver coil L2 is the only coil configured to receive the power transferred from the transmitter.

In the first phase of the high power mode, the switches Q2 and Q3 are turned off as indicated by the arrows on the respective symbols. The switches Q1 and Q4 are turned on. The current flows through the first switch Q1, the first capacitor C1, the first receiver coil L2 and the fourth switch Q4 as indicated by the dashed line shown in FIG. 5.

Figure 6:
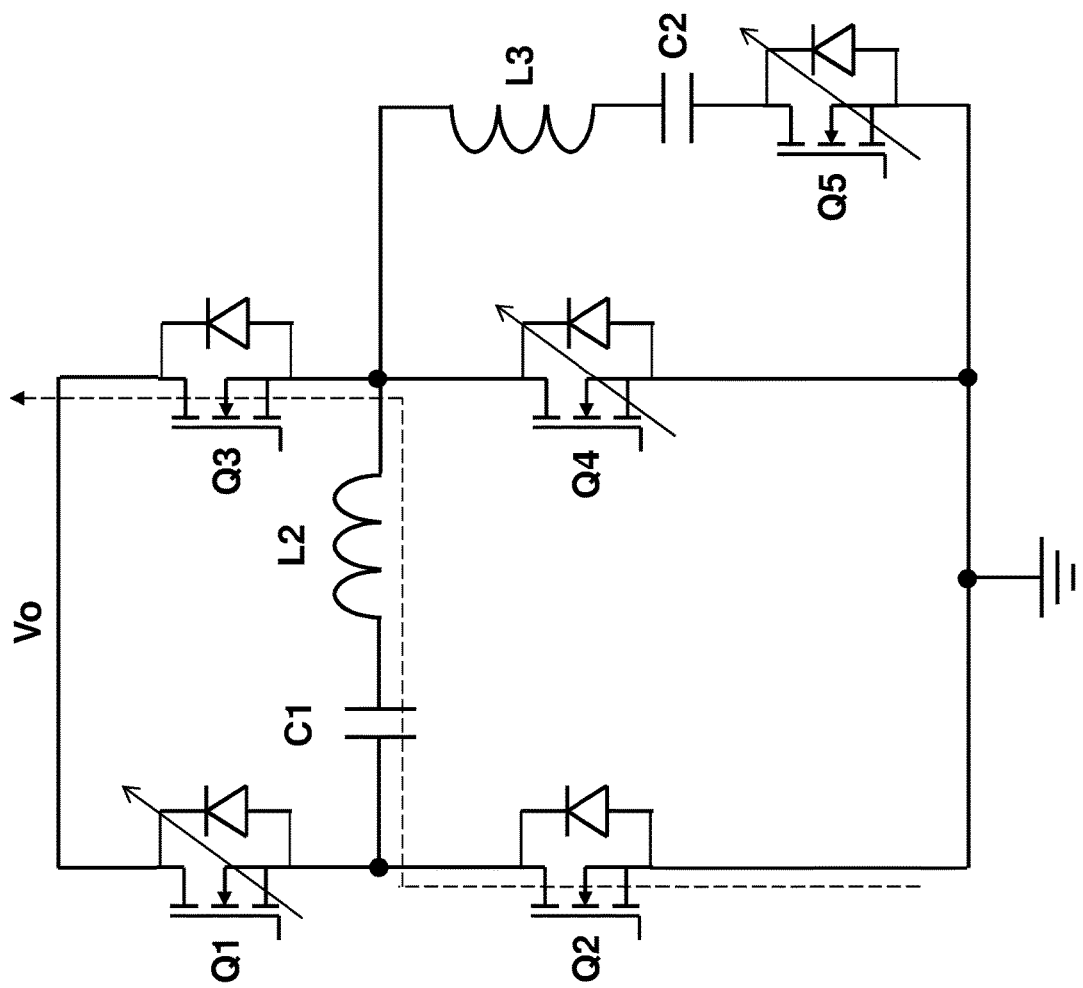
FIG. 6 illustrates a schematic diagram of the receiver configured to operate in a second phase of the high power mode in accordance with various embodiments of the present disclosure.

FIG. 6 illustrates a schematic diagram of the receiver configured to operate in a second phase of the high power mode in accordance with various embodiments of the present disclosure. In the second phase of the high power mode, the switches Q1 and Q4 are turned off as indicated by the arrows on the respective symbols. The switches Q2 and Q3 are turned on. The current flows through the second switch Q2, the first capacitor C1, the first receiver coil L2 and the third switch Q3 as indicated by the dashed line shown in FIG. 6.

One advantageous feature of having the high power mode described above with respect to FIGS. 5-6 is the receiver shown in FIG. 2 is able to achieve high efficiency. In particular, the first receiver coil L2 is small in size. Such a small coil has low resistance. The low resistance helps to reduce the coil temperature, thereby improving the efficiency of the wireless power transfer system.

Figure 7:
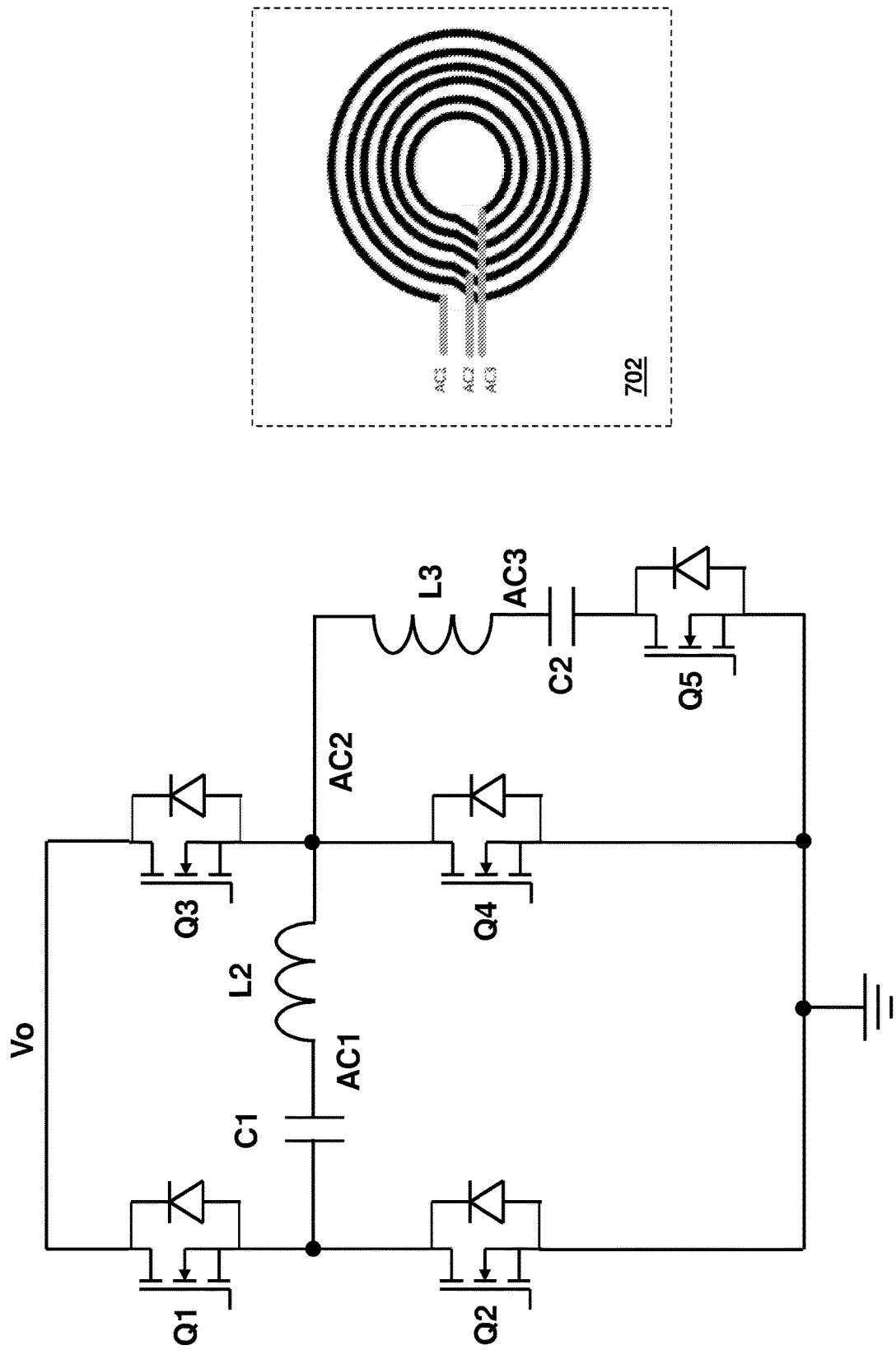
FIG. 7 illustrates an implementation of the first receiver coil and the second receiver coil in accordance with various embodiments of the present disclosure.

FIG. 7 illustrates an implementation of the first receiver coil and the second receiver coil in accordance with various embodiments of the present disclosure. In some embodiments, the first receiver coil L2 and the second receiver coil L3 are from a continuous coil. As shown in FIG. 7, the continuous coil 702 has a plurality of turns. The continuous coil 702 has three terminals, namely AC1, AC2 and AC3. A first terminal AC1 is connected to the first capacitor C1. A second terminal AC2 is connected to the common node of Q3 and Q4. A third terminal AC3 is connected to the second capacitor C2.

One skilled in the art will recognize that the continuous coil 702 shown in FIG. 7 is simply one embodiment and that other configurations for two receiver coils can be employed. For example, the two receiver coils L2 and L3 may be implemented as two separate coils.

Figure 8:
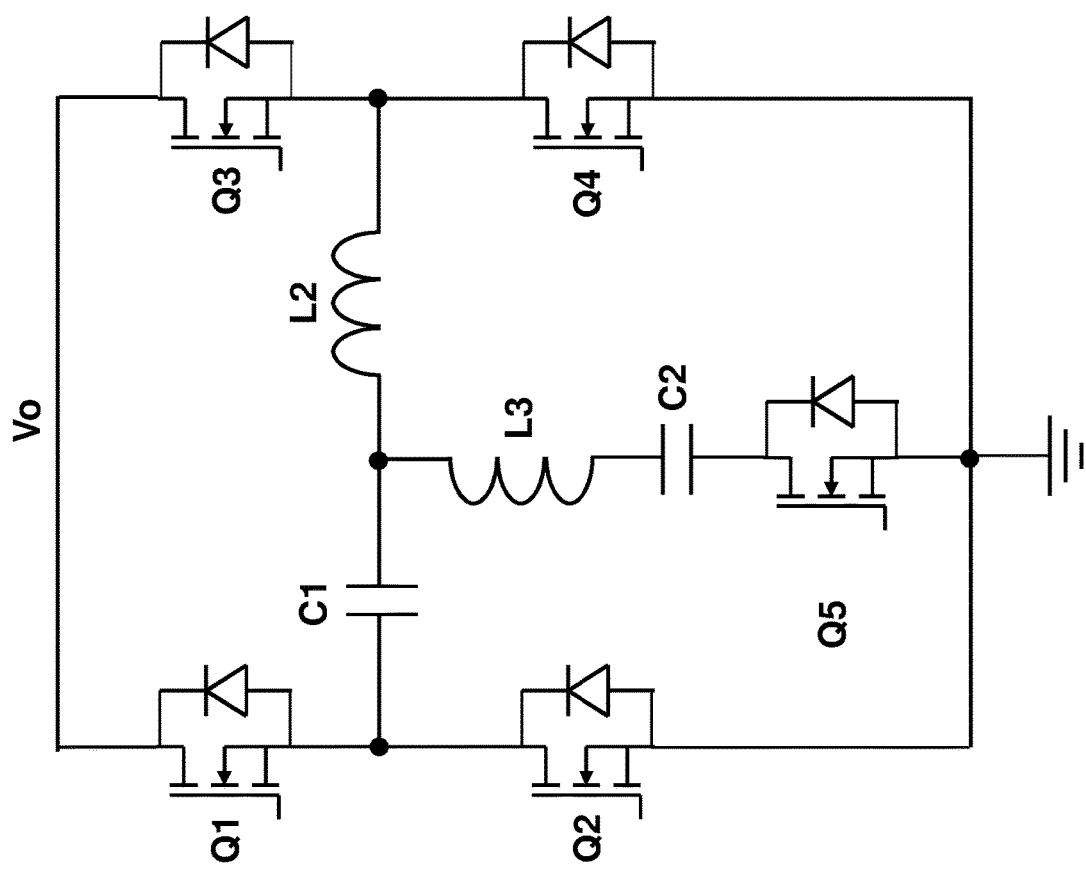
FIG. 8 illustrates a schematic diagram of a second implementation of the receiver of the wireless power transfer system shown in FIG. 1 in accordance with various embodiments of the present disclosure.

FIG. 8 illustrates a schematic diagram of a second implementation of the receiver of the wireless power transfer system shown in FIG. 1 in accordance with various embodiments of the present disclosure. The receiver shown in FIG. 8 is similar to the receiver shown in FIG. 2 except that the second receiver coil L3, the second capacitor C2 and the auxiliary switch Q5 are connected in series between a common node of the first capacitor C1 and the first receiver coil L2, and ground.

Figure 9:
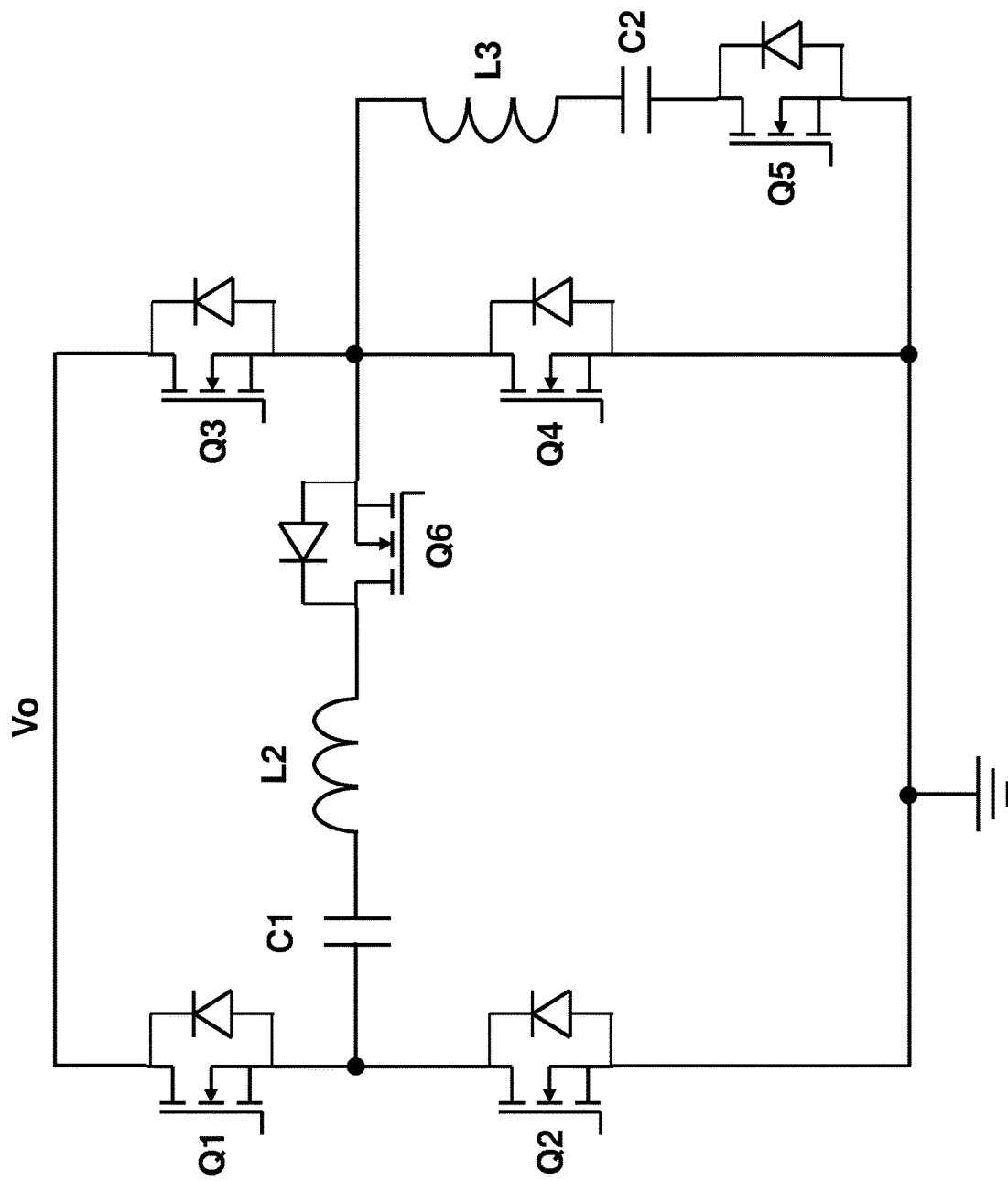
FIG. 9 illustrates a schematic diagram of a third implementation of the receiver of the wireless power transfer system shown in FIG. 1 in accordance with various embodiments of the present disclosure.

FIG. 9 illustrates a schematic diagram of a third implementation of the receiver of the wireless power transfer system shown in FIG. 1 in accordance with various embodiments of the present disclosure. The receiver shown in FIG. 9 is similar to the receiver shown in FIG. 2 except that a second auxiliary switch Q6 is employed to further improve the performance of the receiver. As shown in FIG. 9, a common node of the first switch Q1 and the second switch Q2 is connected to a first terminal of the first receiver coil L2 through the first capacitor C1. A common node of the third switch Q3 and the fourth switch Q4 is connected to a second terminal of the first receiver coil L2 through the second auxiliary switch Q6. The second auxiliary switch Q6 offers one more control variable for better controlling the receiver.

In operation, the receiver having a low gain is able to establish a bias voltage successfully when the receiver is magnetically coupled to a high power transmitter. On the other hand, the receiver having a low gain is not able to establish the bias voltage successfully when the receiver is magnetically coupled to a low power transmitter. A startup circuit is necessary to help the receiver establish the bias voltage under various operating conditions.

Figure 10:
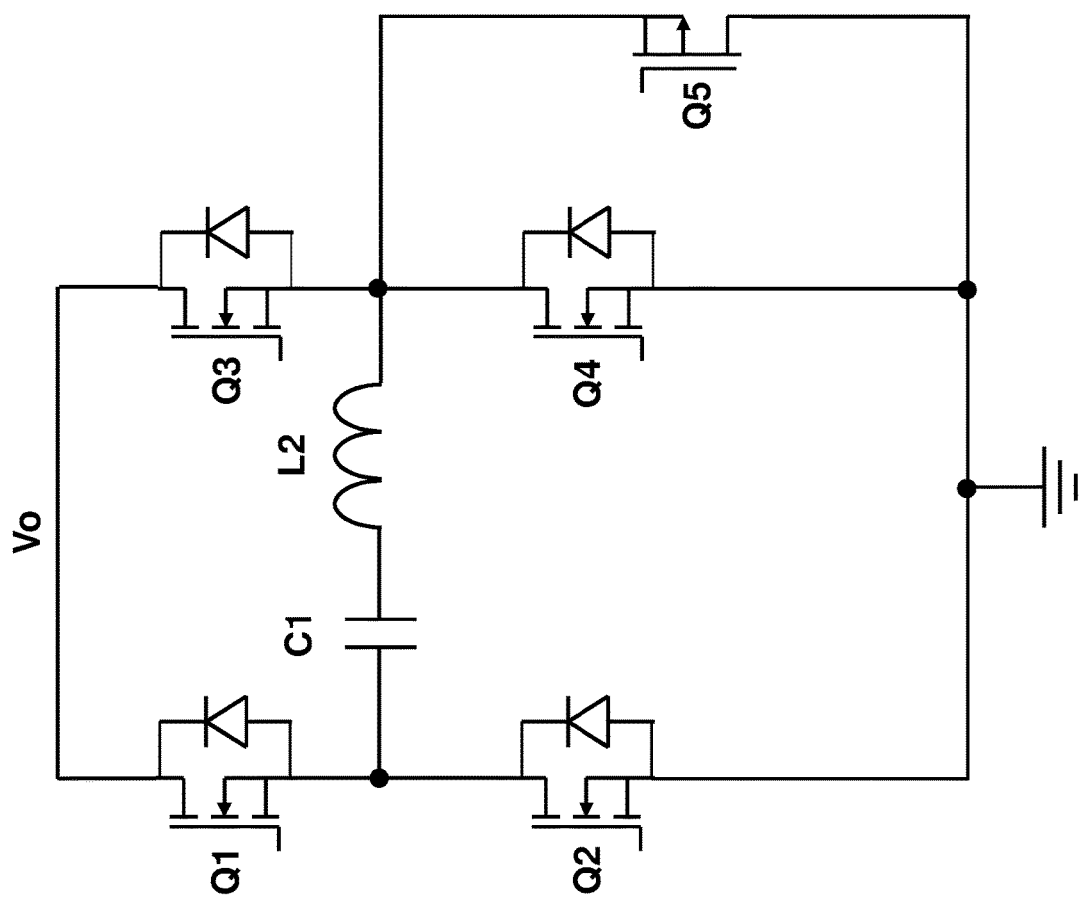
FIG. 10 illustrates a schematic diagram of a first implementation of a startup circuit of the receiver of the wireless power transfer system shown in FIG. 1 in accordance with various embodiments of the present disclosure.

FIG. 10 illustrates a schematic diagram of a first implementation of a startup circuit of the receiver of the wireless power transfer system shown in FIG. 1 in accordance with various embodiments of the present disclosure. The startup circuit comprises a depletion mode switch Q5. As shown in FIG. 10, the depletion mode switch Q5 is connected between the common node of switches Q3 and Q4, and ground. During a startup process, the depletion mode switch Q5 is turned on before the bias voltage is established. The turned-on Q5 helps to establish the bias voltage of the receiver. More particularly, the depletion mode switch Q5, the body diode of Q1 and the body diode of Q2 form a half-bridge circuit. This half-bridge circuit functions as a voltage doubler configured to establish the bias voltage under a low voltage gain. The operating principle of the half-bridge circuit will be discussed below with respect to FIGS. 11-12.

Figure 11:
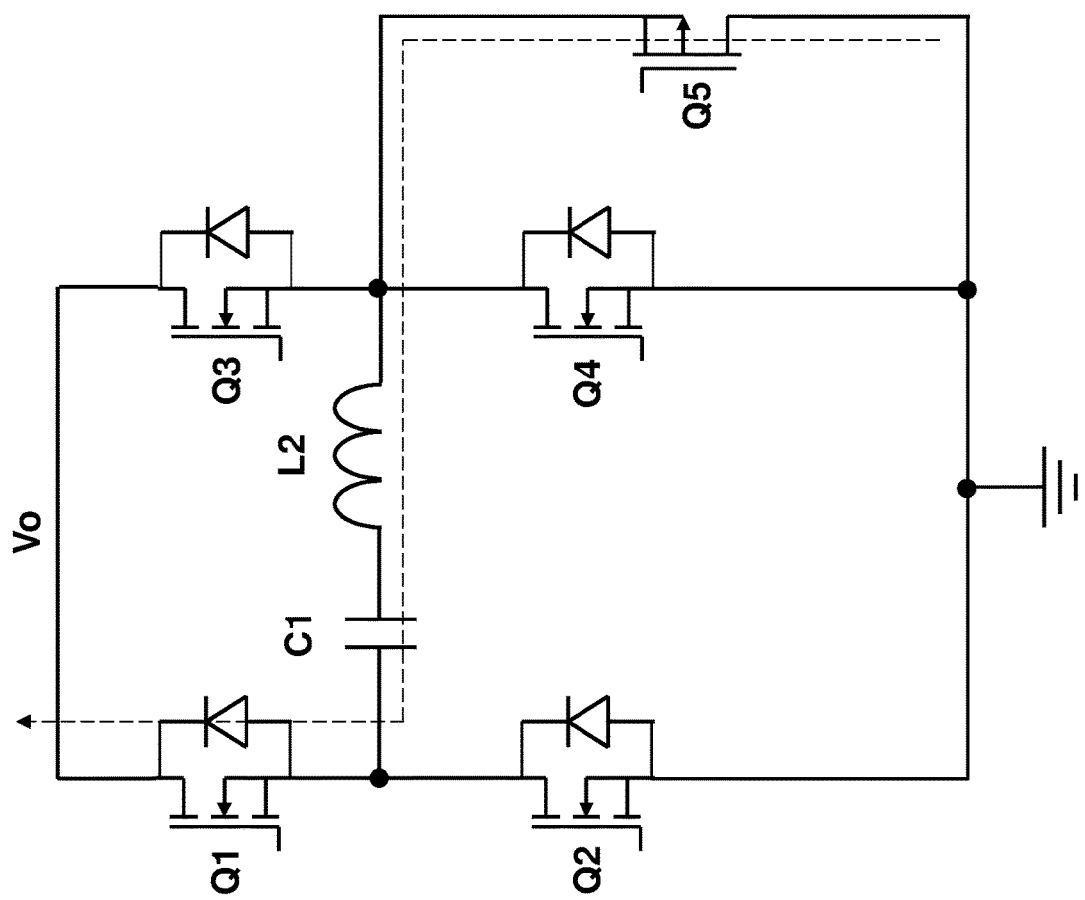
FIG. 11 illustrates a schematic diagram of the startup circuit configured to operate in a first phase in accordance with various embodiments of the present disclosure.

FIG. 11 illustrates a schematic diagram of the startup circuit configured to operate in a first phase in accordance with various embodiments of the present disclosure. During the startup process, the switches Q1-Q4 are not turned on because the bias voltage is not fully established yet. Q5 is turned on because Q5 is a depletion mode transistor. In some embodiments, Q5, the body diode of Q1, the body diode of Q2, the first receiver coil L2 form a half-bridge circuit configured to establish the bias voltage. The half-bridge circuit is configured to operate in two different phases.

In the first phase, a current flows through a body diode of the first switch Q1, the first capacitor C1, the first receiver coil L2 and Q5 as indicated by the dashed line shown in FIG. 11. The current is used to charge a bias capacitor (not shown) for establishing the bias voltage.

Figure 12:
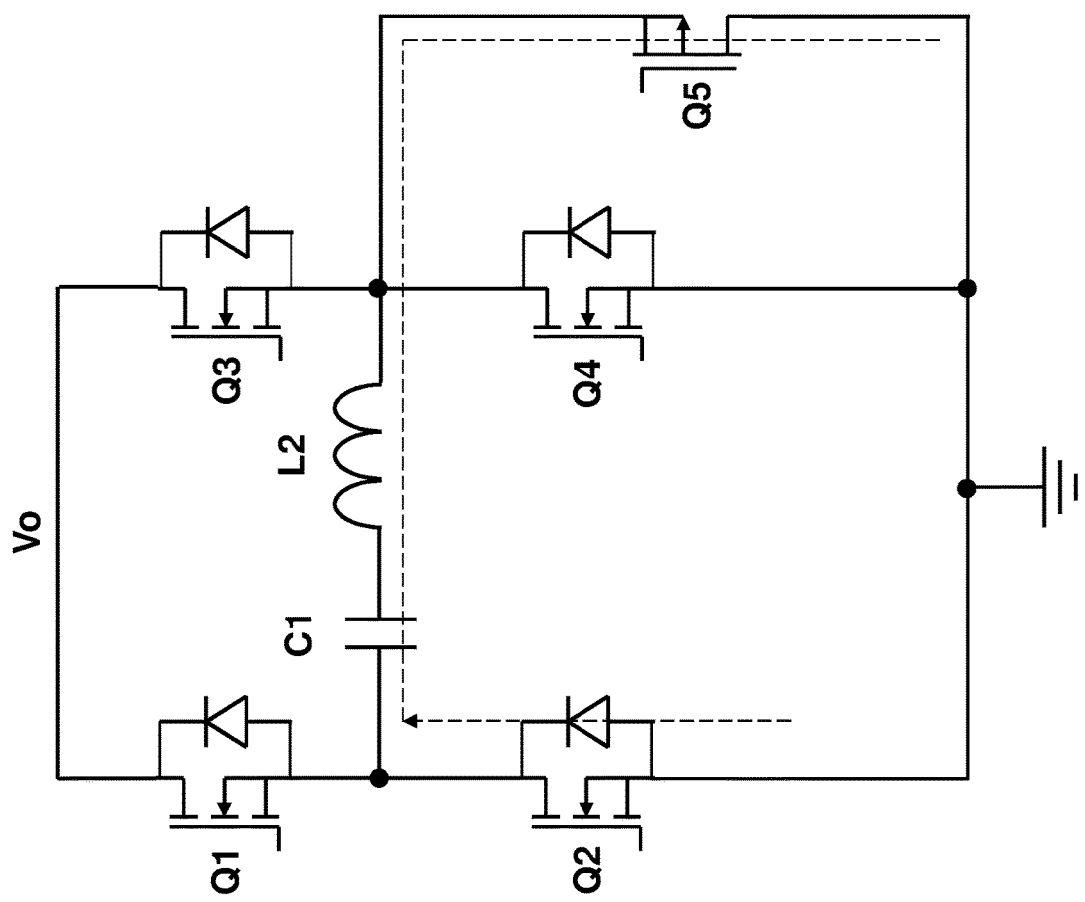
FIG. 12 illustrates a schematic diagram of the startup circuit configured to operate in a second phase in accordance with various embodiments of the present disclosure.

FIG. 12 illustrates a schematic diagram of the startup circuit configured to operate in a second phase in accordance with various embodiments of the present disclosure. In the second phase, a current flows through a body diode of the first switch Q2, the first capacitor C1, the first receiver coil L2 and Q5 as indicated by the dashed line shown in FIG. 12. The current is used to charge the bias capacitor (not shown) for establishing the bias voltage.

After the bias voltage has been established, the receiver enters into a normal mode. In the normal mode, Q5 has been turned off. The rectifier circuit is configured to operate in a half-bridge mode. The half-bridge mode has two different phases, which will be discussed below with respect to FIG. 13 and FIG. 14, respectively.

Figure 13:
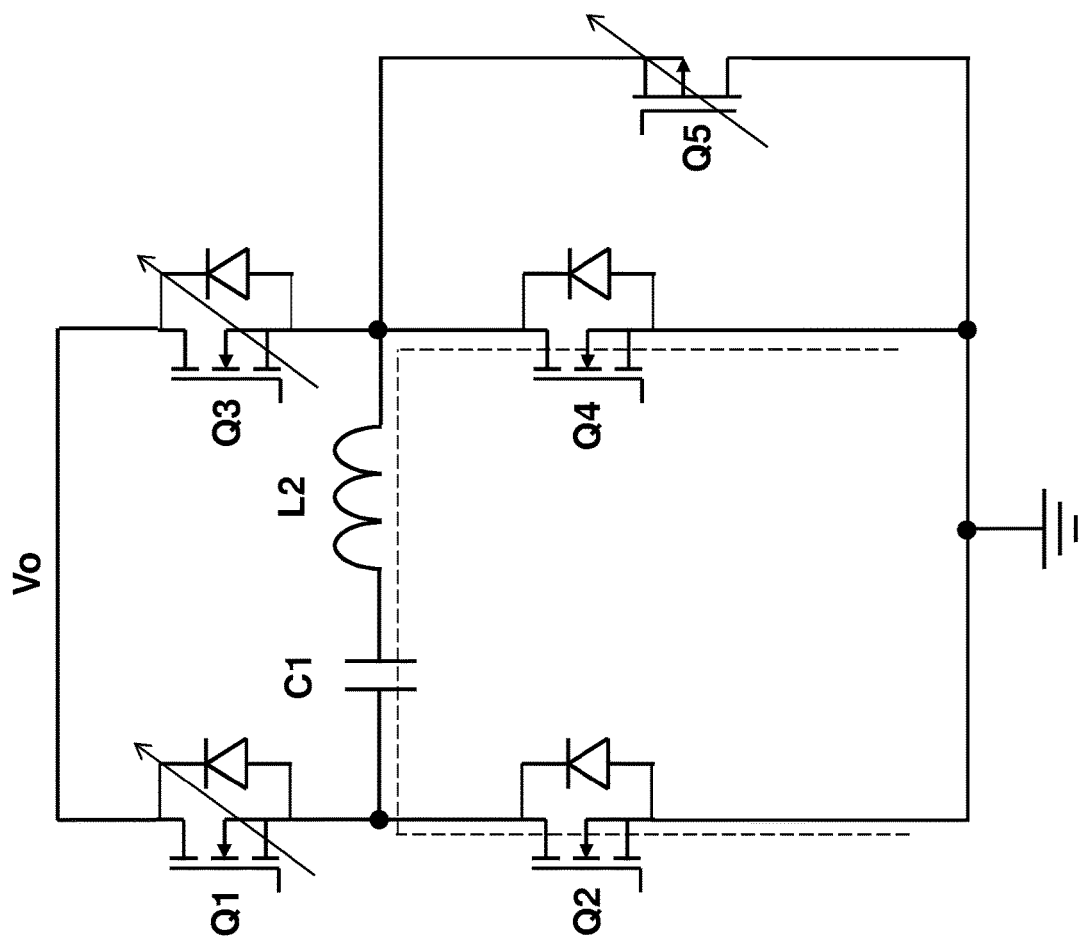
FIG. 13 illustrates a schematic diagram of the startup circuit configured to operate in a first phase of a normal mode in accordance with various embodiments of the present disclosure.

FIG. 13 illustrates a schematic diagram of the startup circuit configured to operate in a first phase of a normal mode in accordance with various embodiments of the present disclosure. After the bias voltage has been established, Q5 is turned off as shown in FIG. 13. In the first phase of the normal mode, Q1 and Q3 are turned off as indicated by the arrows on the respective symbols. A current flows through a conductive path formed by the second switch Q2, the first capacitor C1, the first receiver coil L2 and the fourth switch Q4.

Figure 14:
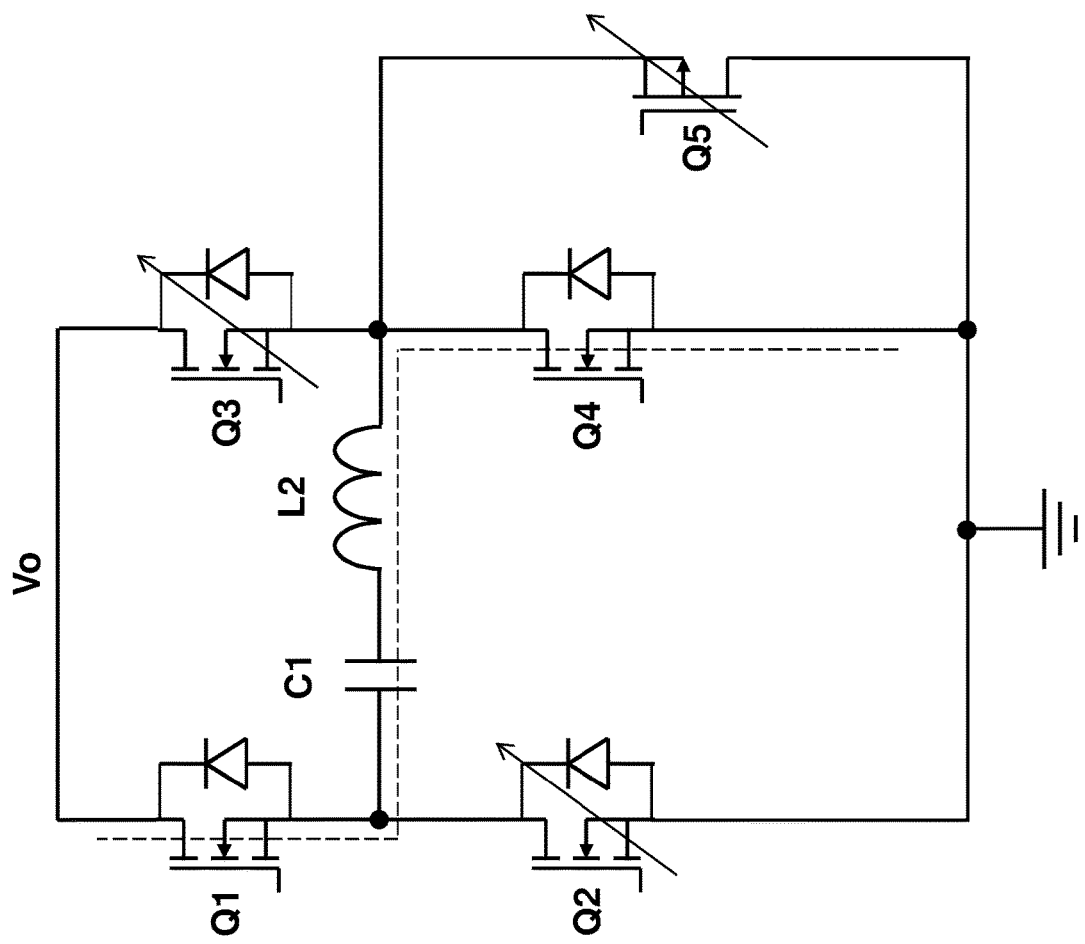
FIG. 14 illustrates a schematic diagram of the startup circuit configured to operate in a second phase of the normal mode in accordance with various embodiments of the present disclosure

FIG. 14 illustrates a schematic diagram of the startup circuit configured to operate in a second phase of the normal mode in accordance with various embodiments of the present disclosure. In the second phase of the normal mode, Q2 and Q3 are turned off as indicated by the arrows on the respective symbols. The current flows through a conductive path formed by the first switch Q1, the first capacitor C1, the first receiver coil L2 and the fourth switch Q4.

Figure 15:
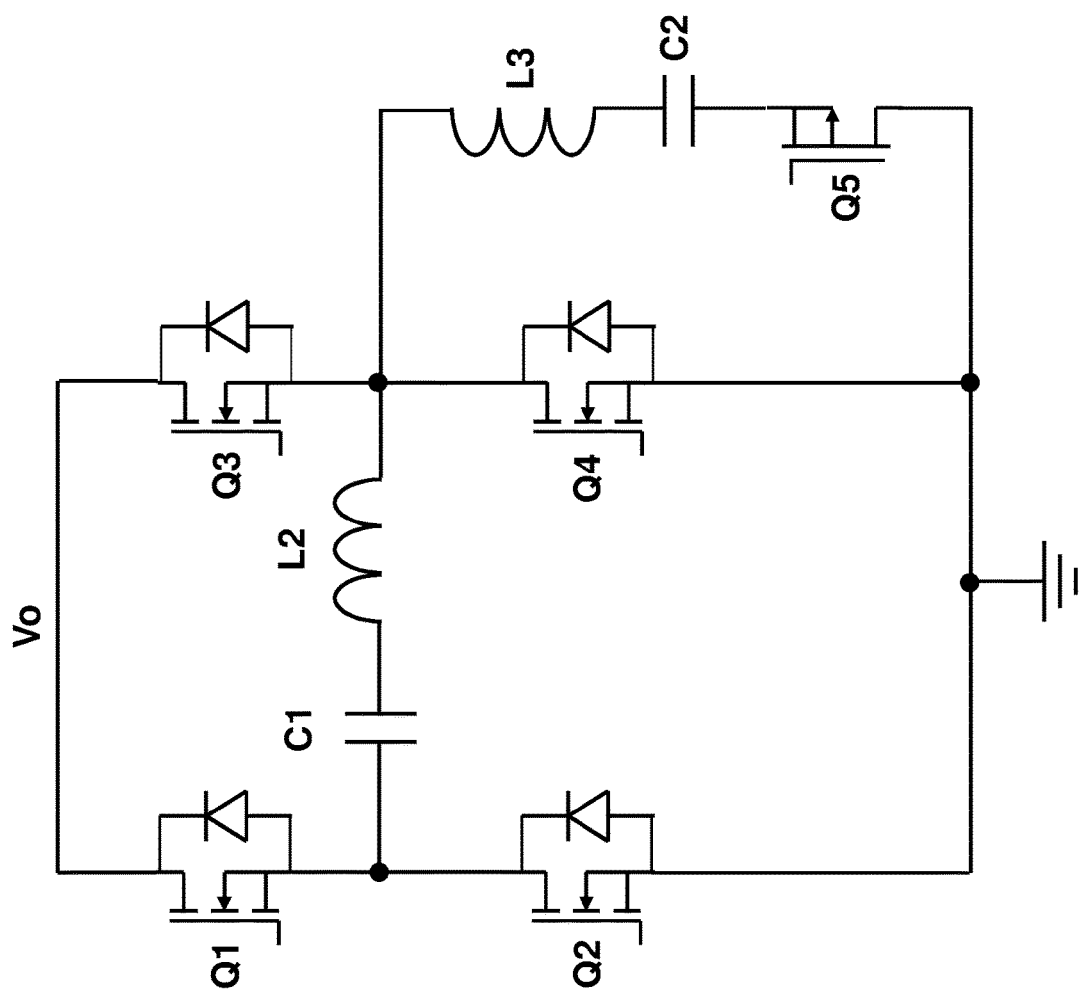
FIG. 15 illustrates a schematic diagram of a second implementation of the startup circuit of the receiver of the wireless power transfer system shown in FIG. 1 in accordance with various embodiments of the present disclosure.

FIG. 15 illustrates a schematic diagram of a second implementation of the startup circuit of the receiver of the wireless power transfer system shown in FIG. 1 in accordance with various embodiments of the present disclosure. The startup circuit shown in FIG. 15 is similar to the circuit shown in FIG. 2 except that Q5 is implemented as a depletion mode transistor. During a startup process, the depletion mode switch Q5 is turned on before the bias voltage is established. The turned-on Q5 helps to establish the bias voltage of the receiver. More particularly, the depletion mode switch Q5, the body diode of Q1 and the body diode of Q2 form a half-bridge circuit. This half-bridge circuit functions as a voltage doubler configured to establish the bias voltage under a low voltage gain between the transmitter and the receiver. The operating principle of the half-bridge circuit will be discussed below with respect to FIGS. 16-17.

Figure 16:
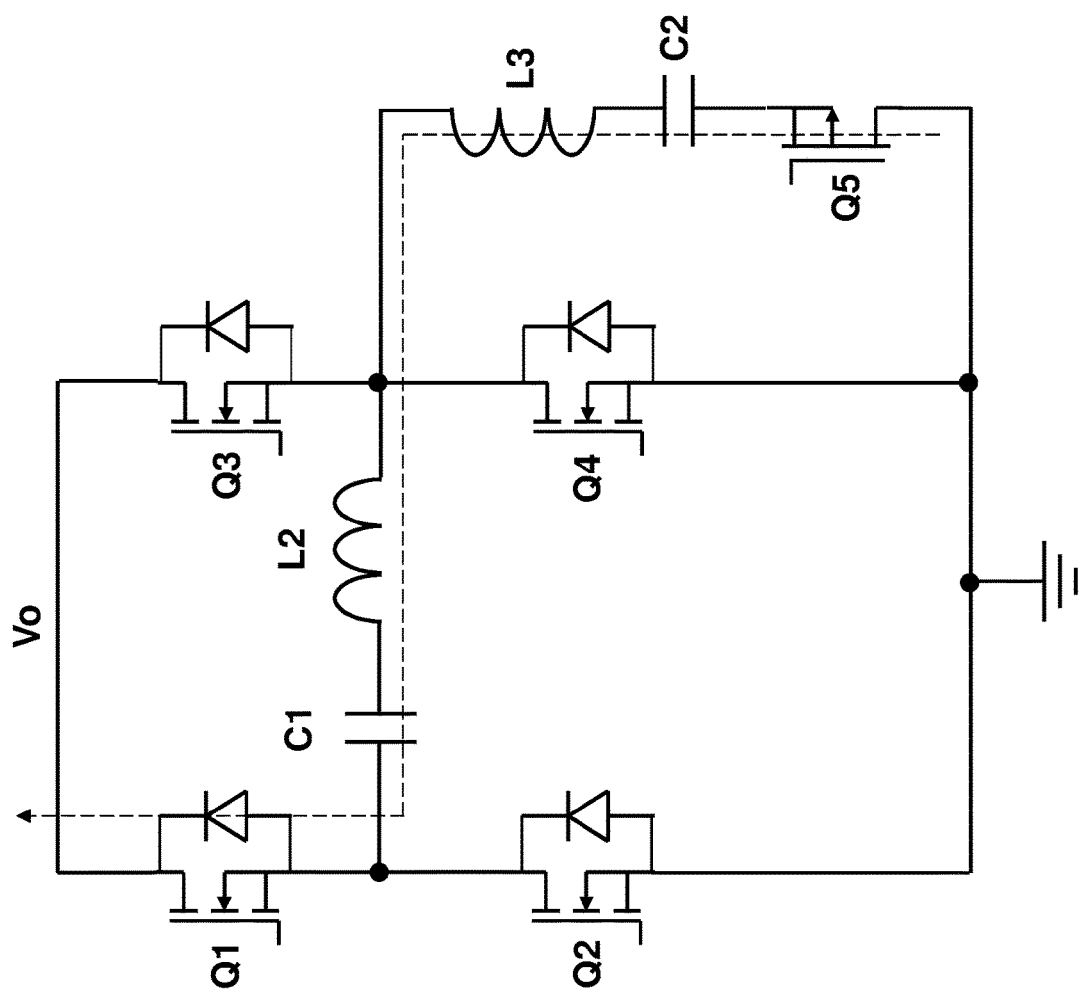
FIG. 16 illustrates a schematic diagram of the startup circuit of FIG. 15 configured to operate in a first phase in accordance with various embodiments of the present disclosure.

FIG. 16 illustrates a schematic diagram of the startup circuit of FIG. 15 configured to operate in a first phase in accordance with various embodiments of the present disclosure. During the startup process, the switches Q1-Q4 are not turned on because the bias voltage is not fully established yet. Q5 is turned on because Q5 is a depletion mode transistor. Q5, the body diode of Q1, the body diode of Q2, the first receiver coil L2 form a half-bridge circuit. The half-bridge circuit is configured to operate in two different phases.

In the first phase, a current flows through a body diode of the first switch Q1, the first capacitor C1, the first receiver coil L2, the second receiver coil L3, the second capacitor C2 and Q5 as indicated by the dashed line shown in FIG. 16. The current is used to charge a bias capacitor (not shown) for establishing the bias voltage.

Figure 17:
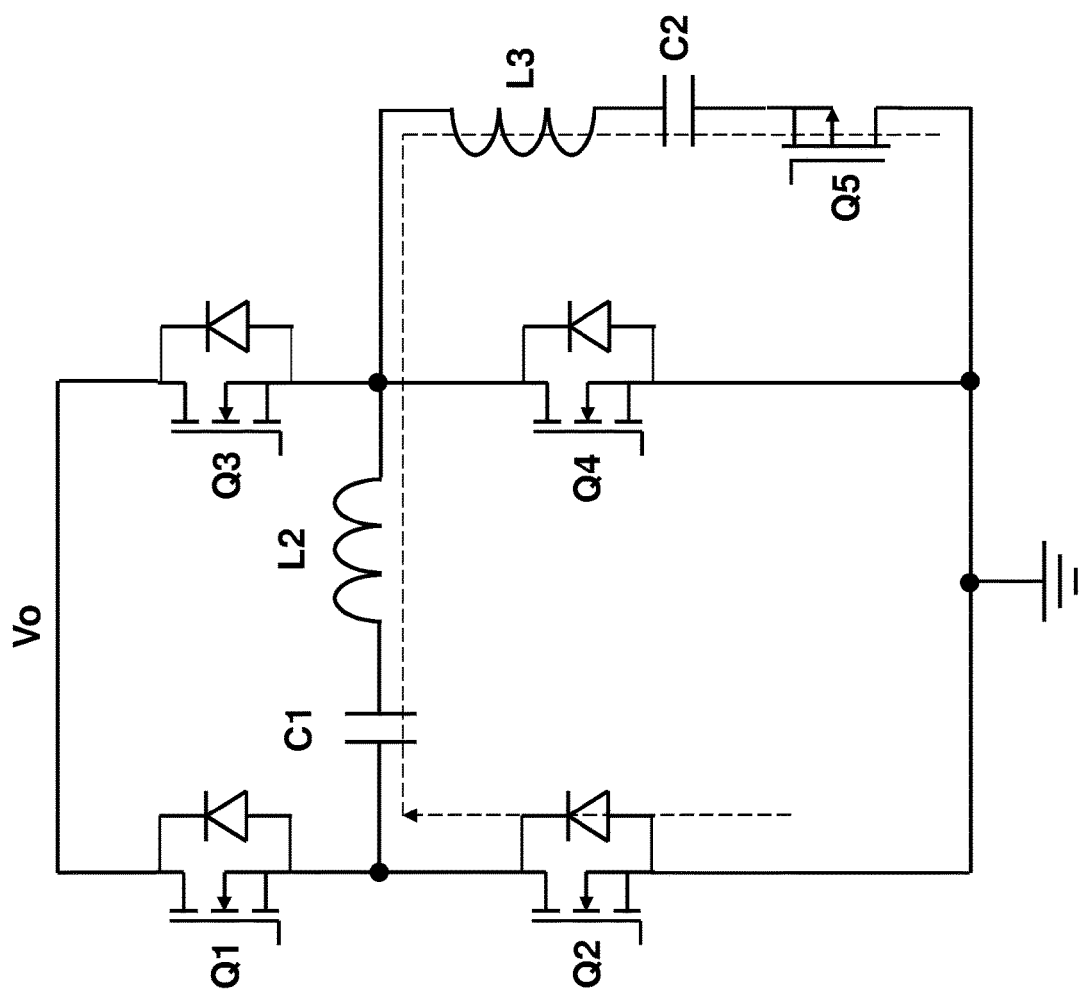
FIG. 17 illustrates a schematic diagram of the startup circuit of FIG. 15 configured to operate in a second phase in accordance with various embodiments of the present disclosure.

FIG. 17 illustrates a schematic diagram of the startup circuit of FIG. 15 configured to operate in a second phase in accordance with various embodiments of the present disclosure. In the second phase, the current flows through a body diode of the second switch Q2, the first capacitor C1 and the first receiver coil L2, the second receiver coil L3, the second capacitor C2 and Q5 as indicated by the dashed line shown in FIG. 17. The current is used to charge the bias capacitor (not shown) for establishing the bias voltage.

The circuit shown in FIGS. 15-17 is similar to the circuit shown in FIG. 2 except that Q5 is a depletion mode transistor. The low power mode and the high power mode discussion above with respect to FIGS. 3-6 are applicable to the circuit shown in FIGS. 15-17. Depending on different power modes, the circuit shown in FIGS. 15-17 is configured accordingly.

Figure 18:
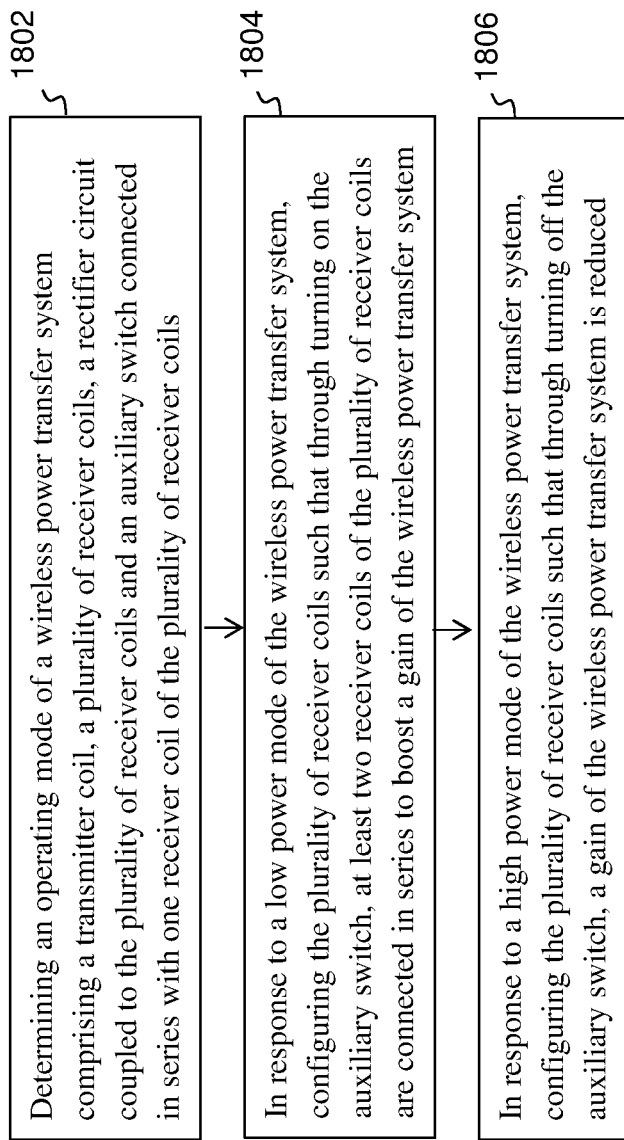
FIG. 18 illustrates a flow chart of controlling the receiver shown in FIG. 2 in accordance with various embodiments of the present disclosure.

FIG. 18 illustrates a flow chart of controlling the receiver shown in FIG. 2 in accordance with various embodiments of the present disclosure. This flowchart shown in FIG. 18 is merely an example, which should not unduly limit the scope of the claims. One of ordinary skill in the art would recognize many variations, alternatives, and modifications. For example, various steps illustrated in FIG. 18 may be added, removed, replaced, rearranged and repeated.

Referring back to FIG. 1, the wireless power transfer system comprises a transmitter and a receiver. Depending on different applications, the transmitter may be a high power transmitter. When the receiver (e.g., receiver shown in FIG. 2) is magnetically coupled to this high power transmitter, the receiver is configured to operate in a high power mode. On the other hand, when the transmitter is a low power transmitter, the receiver is configured to operate in a low power mode.

The receiver comprises multiple receiver coils. Depending on different power modes, the multiple receiver coils may be configured differently so that the receiver is compatible with different power modes. The receiver is controlled according to the following steps.

At step 1802, a controller is configured to determine an operating mode of the wireless power transfer system. The wireless power transfer system comprises a transmitter coil, a plurality of receiver coils, a rectifier circuit coupled to the plurality of receiver coils and an auxiliary switch connected in series with one receiver coil of the plurality of receiver coils. The wireless power transfer system may operate in a low power mode, which requires a normal gain between the transmitter and the receiver. On the other hand, the wireless power transfer system may operate in a high power mode, which requires a reduced gain between the transmitter and the receiver.

At step 1804, in response to the low power mode of the wireless power transfer system, the plurality of receiver coils is configured such that through turning on the auxiliary switch, at least two receiver coils of the plurality of receiver coils are connected in series to boost the gain of the wireless power transfer system.

At step 1806, in response to a high power mode of the wireless power transfer system, the plurality of receiver coils is configured such that through turning off the auxiliary switch, a gain of the wireless power transfer system is reduced.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:
   a controller configured to control switches of a receiver, the receiver comprising a first receiver coil configured to be magnetically coupled to a transmitter coil of a wireless power transfer system, a rectifier circuit coupled to two terminals of the first receiver coil, a second receiver coil and an auxiliary switch, wherein the first receiver coil and a first capacitor are connected in series between a first midpoint of the rectifier circuit and a second midpoint of the rectifier circuit, the second receiver coil, a second capacitor and the auxiliary switch are connected in series between the first midpoint of the rectifier circuit and ground, and the second receiver coil is configured to be magnetically coupled to the transmitter coil, and wherein in response to a low power mode of the apparatus, the controller is configured to turn on the auxiliary switch such that the first receiver coil and the second receiver coil are connected in series to boost a gain of the wireless power transfer system.

2. The apparatus of claim 1, wherein:
the rectifier circuit comprises a first switch and a second switch connected in series, and a third switch and a fourth switch connected in series.

3. The apparatus of claim 1, wherein:
the first receiver coil and the second receiver coil are configured to be magnetically coupled to a transmitter coil for transferring energy in the wireless power transfer system.

4. The apparatus of claim 1, wherein:
in response to a high power mode of the wireless power transfer system, the controller is configured to turn off the auxiliary switch so as to disconnect the second receiver coil from the first receiver coil, and wherein in the high power mode, the controller configures the rectifier circuit as a full-bridge rectifier.

5. The apparatus of claim 1, wherein:
the first receiver coil and the second receiver coil are from a continuous coil having three terminals.

6. The apparatus of claim 1, wherein the receiver further comprises a second auxiliary switch, wherein:
the auxiliary switch is a first auxiliary switch;
the rectifier circuit comprises a first switch and a second switch connected in series, and a third switch and a fourth switch connected in series, and wherein:
the second auxiliary switch is coupled between the between the first midpoint of the rectifier circuit and the second midpoint of the rectifier circuit.

7. The apparatus of claim 1, wherein:
the rectifier circuit comprises a first switch and a second switch connected in series, and a third switch and a fourth switch connected in series, and wherein during the low power mode of the wireless power transfer system, the controller is configured such that the rectifier circuit, the first receiver coil, the second receiver coil and the auxiliary switch are configured to operate in a half-bridge operating mode.

8. The apparatus of claim 7, wherein:
in a first phase of the half-bridge operating mode, the controller is configured to turn on the first switch and the third switch, and turn off the second switch and the fourth switch; and
in a second phase of the half-bridge operating mode, the controller is configured to turn off the first switch and the third switch, and turn on the second switch and the fourth switch.

9. The apparatus of claim 1, wherein:
the rectifier circuit has outputs coupled to a load, and wherein the controller is configured to control switches of the rectifier circuit such that an alternating polarity waveform is converted into a single polarity waveform.

10. A method comprising:
determining, by a controller, an operating mode of a wireless power transfer system comprising a transmitter coil, a plurality of receiver coils, a rectifier circuit coupled to the plurality of receiver coils and an auxiliary switch connected in series with one receiver coil of the plurality of receiver coils;
in response to a low power mode of the wireless power transfer system, turning on the auxiliary switch through a signal generated by the controller, wherein as a result of turning on the auxiliary switch, at least two receiver coils of the plurality of receiver coils are connected in series to boost a gain of the wireless power transfer system, wherein a first receiver coil of the plurality of receiver coils and a first capacitor are connected in series between a first midpoint of the rectifier circuit and a second midpoint of the rectifier circuit, and a second receiver coil of the plurality of receiver coils, a second capacitor and the auxiliary switch are connected in series between the first midpoint of the rectifier circuit and ground; and
in response to a high power mode of the wireless power transfer system, turning off the auxiliary switch through the signal generated by the controller, wherein as a result of turning off the auxiliary switch, a gain of the wireless power transfer system is reduced.

11. The method of claim 10, wherein:
the rectifier circuit comprises a first switch and a second switch connected in series, and a third switch and a fourth switch connected in series.

12. The method of claim 11, further comprising:
in a first phase of the low power mode, configuring the rectifier circuit by the controller such that a current flows through the auxiliary switch, the second capacitor, the second receiver coil, and splits into a first conducive path and a second conductive path, respectively, wherein the first conductive path comprises the first switch, the first capacitor and the first receiver coil, and the second conductive path comprises the third switch; and
in a second phase of the low power mode, configuring the rectifier circuit by the controller such that the current flows through the auxiliary switch, the second capacitor, the second receiver coil, and splits into a third conducive path and a fourth conductive path, respectively, wherein the third conductive path comprises the second switch, the first capacitor and the first receiver coil, and the fourth conductive path comprises the fourth switch.

13. The method of claim 11, further comprising:
in a first phase of the high power mode, configuring the rectifier circuit by the controller such that a current flows through the first switch, the first capacitor and the first receiver coil and the fourth switch; and
in a second phase of the high power mode, configuring the rectifier circuit by the controller such that the current flows through the second switch, the first capacitor and the first receiver coil and the third switch.

14. The method of claim 11, wherein:
the auxiliary switch is a depletion mode transistor, and wherein the controller is configured to generate a signal to turn off the depletion mode transistor.

15. The method of claim 14, further comprising:
in a first phase of a startup process, configuring the rectifier circuit by the controller such that a current flows through a body diode of the first switch, the first capacitor and the first receiver coil, the second receiver coil, the second capacitor and the auxiliary switch; and in a second phase of the startup process, configuring the rectifier circuit by the controller such that the current flows through a body diode of the second switch, the first capacitor and the first receiver coil, the second receiver coil, the second capacitor and the auxiliary switch.

16. A controller comprising:
a circuit configured to control an auxiliary switch and switches of a rectifier circuit, wherein:
the rectifier circuit is coupled to a first receiver coil configured to be magnetically coupled to a transmitter coil of a wireless power transfer system, and wherein in response to a low power mode of the wireless power transfer system, the controller is configured to turn on the auxiliary switch such that the first receiver coil and the second receiver coil are connected in series to boost a gain of the wireless power transfer system, and wherein the first receiver coil and a first capacitor are connected in series between a first midpoint of the rectifier circuit and a second midpoint of the rectifier circuit, and the second receiver coil, a second capacitor and the auxiliary switch are connected in series between the first midpoint of the rectifier circuit and ground.

17. The controller of claim 16, wherein:
the rectifier circuit comprises a first switch and a second switch connected in series, and a third switch and a fourth switch connected in series.

18. The controller of claim 17, wherein:
in a first phase of the low power mode, the controller is configured to control the rectifier circuit and the auxiliary switch such that a current flows through the auxiliary switch, the second capacitor, the second receiver coil, and splits into a first conducive path and a second conductive path, respectively, wherein the first conductive path comprises the first switch, the first capacitor and the first receiver coil, and the second conductive path comprises the third switch; and
in a second phase of the low power mode, the controller is configured to control the rectifier circuit and the auxiliary switch such that the current flows through the auxiliary switch, the second capacitor, the second receiver coil, and splits into a third conducive path and a fourth conductive path, respectively, wherein the third conductive path comprises the second switch, the first capacitor and the first receiver coil, and the fourth conductive path comprises the fourth switch.

19. The controller of claim 17, wherein:
in a first phase of a high power mode of the wireless power transfer system, the controller is configured to control the rectifier circuit and the auxiliary switch such that a current flows through the first switch, the first capacitor and the first receiver coil and the fourth switch; and
in a second phase of the high power mode of the wireless power transfer system, the controller is configured to control the rectifier circuit and the auxiliary switch such that the current flows through the second switch, the first capacitor and the first receiver coil and the third switch.

\* \* \* \* \*